US008073726B1

(12) United States Patent
Liu et al.

(10) Patent No.: US 8,073,726 B1
(45) Date of Patent: Dec. 6, 2011

(54) SYSTEM AND METHOD FOR GENERATING SOLUTIONS BASED ON ASSOCIATED OPERATIONAL PENALTIES FOR ALLOCATING CREW MEMBERS

(75) Inventors: Xin Liu, Grapevine, TX (US); Tuell Green, Euless, TX (US); Eric Parker, Heath, TX (US); Matt Korol, Southlake, TX (US); Jim Diamond, Grapevine, TX (US)

(73) Assignee: American Airlines, Inc., Fort Worth, TX (US)

( * ) Notice: Subject to any disclaimer, the term of this patent is extended or adjusted under 35 U.S.C. 154(b) by 1265 days.

(21) Appl. No.: 11/726,946

(22) Filed: Mar. 23, 2007

(51) Int. Cl.
*G06F 9/44* (2006.01)
(52) U.S. Cl. ............... 705/7.22; 705/7.16; 705/7.26
(58) Field of Classification Search ............ 705/7.16, 705/7.22, 7.26
See application file for complete search history.

(56) References Cited

U.S. PATENT DOCUMENTS

| | | | | |
|---|---|---|---|---|
| 5,270,921 | A | * | 12/1993 | Hornick ............... 705/6 |
| 6,314,361 | B1 | * | 11/2001 | Yu et al. ............... 701/120 |
| 6,335,733 | B1 | * | 1/2002 | Keren et al. ........... 345/418 |
| 6,408,276 | B1 | * | 6/2002 | Yu et al. ............... 705/7.16 |
| 6,651,046 | B1 | * | 11/2003 | Sato et al. ............. 706/13 |
| 7,191,140 | B2 | * | 3/2007 | Yu et al. ............... 705/7.16 |
| 7,340,405 | B1 | * | 3/2008 | Gunther et al. ........ 705/6 |
| 7,346,528 | B2 | * | 3/2008 | Thengvall et al. ...... 705/7.21 |
| 7,379,887 | B2 | * | 5/2008 | Pachon et al. ......... 705/7.13 |
| 2003/0167110 | A1 | * | 9/2003 | Smith et al. .......... 701/3 |
| 2005/0246208 | A1 | * | 11/2005 | Langerman ........... 705/5 |

OTHER PUBLICATIONS

"Airline Crew Scheduling: A New Formulation and Decomposition Algorithm", by Vance et al., (hereinafter: Vance), School of Industrial and Systems Engineering, Georgia Institute of Technology, May 12, 1995.*
"Airline Operations Recovery", by Ladislav Lettovsky, Georgia Institute of Technology, Oct. 30, 1997.*
"A Heuristic Branch-and-Price Approach for the Airline Crew pairing Problem", by Pamela Vance et al., Department of Industrial and System Engineering, Auburn University, Jun. 23, 1997.*
"Airline Crew Scheduling: State-of-the-Art", by Balaji Gopalakrishnan and Ellis Johnson; Annals of Operations Research, 2005.*
"Deadhead Selection for the Long-Haul Crew Pairing Problem", by Cynthia Barnhart et al., Operations Research, vol. 43, No. 3, May 1995.*
CALEB Technologies Corp., "Company Background," 8 pages.
CALEB Technologies, "CALEB™—PairingSolver™ System," Brochure.
CALEB Technologies, "CALEB™—OpsSolver™ System," Brochure.
CALEB Technologies, "CALEB™—CrewSolver™ System," Brochure.

(Continued)

*Primary Examiner* — Scott L Jarrett
*Assistant Examiner* — Pan Choy
(74) *Attorney, Agent, or Firm* — Haynes and Boone, LLP

(57) ABSTRACT

A system and method for allocating crew is disclosed. A plurality of legs are identified, wherein at least two legs of the plurality of legs are broken. A first crew and a first sequence associated with the first leg of the at least two broken legs are identified. A second crew and a second sequence associated with the second leg of the at least two broken legs is identified. A plurality of new sequences for the first crew and the second crew using deadheads is generated. A solution for each crew is generated using a mixed integer program.

18 Claims, 6 Drawing Sheets

OTHER PUBLICATIONS

Ladislav Lettovksy, "Airline Operations Recovery: An Optimization Approach," A Dissertation Presented to The Reading Committee, In Partial Fulfillment of the Requirements for the Degree Doctor of Philosophy in Industrial and Systems Engineering, Georgia Institute of Technology, Oct. 30, 1997, 144 pages.

Ladislav Lettovsky, Ellis L. Johnson, and George L. Nemhauser, "Airline Crew Recovery," Transportation Science, copyright 2000 Informs, Nov. 2000, pp. 337-348, vol. 34, No. 4; Research Group, SABRE Technology Solutions, Southlake, Texas 76092 (Lettovksy); School of Industrial and Systems Engineering, Georgia Institute of Technology, Atlanta, Georgia 30332-0205 (Johnson and Nemhauser).

Peter Horner, "Change of Direction—How Continental Landed on Its Feet," ORMS Today, Feb. 2002, vol. 29, No. 1.

Peter Horner, "Decisions, Decisions—Repaired for Takeoff," ORMS Today, Jun. 2002, vol. 29, No. 3.

Gang Yu, Michael Arguello, Gao Song, Sandra M. McCowan, and Anna White, "A New Era For Crew Recovery At Continental Airlines," Interfaces, copyright 2003 Informs, Jan.-Feb. 2003, pp. 5-22, vol. 33, No. 1; Department of Management Science and Information Systems, McCombs School of Business, University of Texas at Austin, Austin, Texas 78712 (Yu); CALEB Technologies Corporation, 9130 Jollyville Road, Suite 100, Austin, Texas 78759 (Arguello, Song and McCown); Continental Airlines, 1600 Smith Street, Houston, Texas 77002 (White).

* cited by examiner

SYSTEM AND METHOD FOR GENERATING SOLUTIONS BASED ON ASSOCIATED OPERATIONAL PENALTIES FOR ALLOCATING CREW MEMBERS

BACKGROUND

In many industries, including the travel industry, service positions are assigned to individuals based on a series of factors. In some situations, an event can occur that causes individuals to be unavailable for the assigned service position.

DETAILED DESCRIPTION

Figure 1:
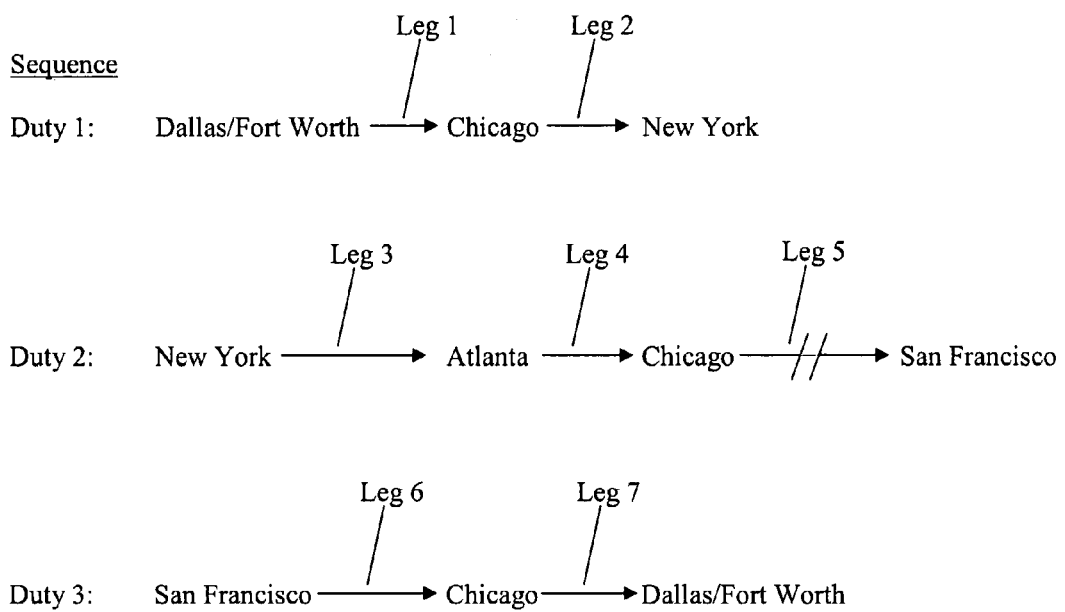
FIG. 1 is a visual depiction of an example sequence that could be used in one embodiment of the present invention.

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, while many of the examples provided below pertain to transactions often conducted in the course of airline industry business, aspects of the present disclosure are applicable and/or readily adaptable to other industries, including rail, bus, cruise and other travel or shipping industries, rental car industries, hotels and other hospitality industries, entertainment industries, and others.

Referring now to FIG. 1, a visual depiction of a sequence is shown. In this particular example, the sequence represents a series of routes to be followed by a crew member on a vehicle, such as an airplane, bus, cruise ship, or truck. In one embodiment, a sequence may be composed of a series of duties, each of which is a series of legs. A leg is a single connection between a departure location and a destination location.

In the example sequence shown in FIG. 1, there are three duties. Duty 1 is composed of Leg 1, which represents a passenger airflight from Dallas/Ft Worth to Chicago, and Leg 2, which is a passenger airflight from Chicago to New York. For example purposes, the expected flying time of Leg 1 is 2 hours and the expected flying time of Leg 2 is two hours. For example purposes, Leg 5 (a passenger airflight from Chicago to San Francisco) is broken. Broken means that an event occurred that causes the vehicle, the operators (such as captains, pilots, and drivers) of the vehicle, service individuals (such as flight attendants) on the vehicle, or any combination of the foregoing, to be unable to perform the connection. Some examples of events that cause a leg to be broken include that the vehicle was delayed, the leg was canceled, the crew was sick, or there was an equipment swap that prevents the current crew from operating the new vehicle.

While a single sequence is shown in FIG. 1, it is contemplated that multiple sequences may exist within a given system in an industry. For example, in the airline industry, there are numerous sequences co-existing within an airline's network.

Figure 2:
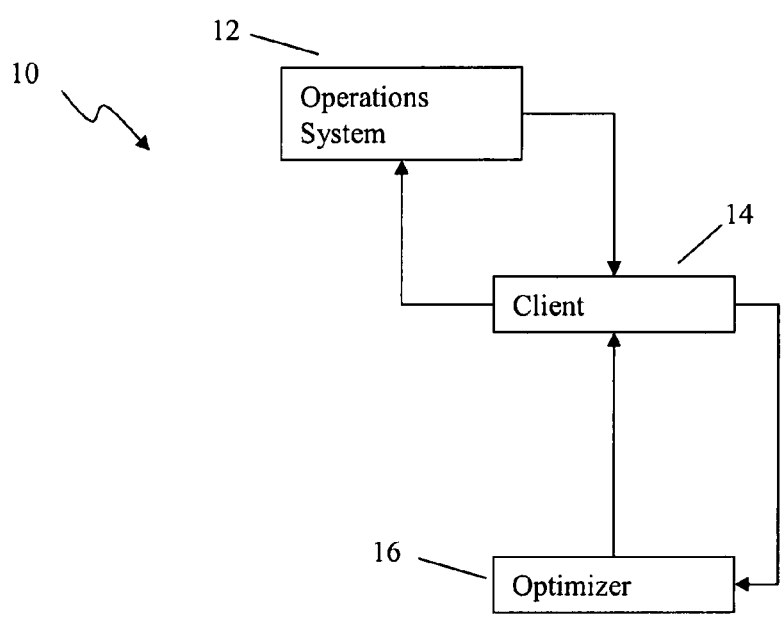
FIG. 2 is a schematic illustration of a system of one embodiment of the present invention.

Referring now to FIG. 2, an example embodiment 10 for allocating crew is depicted. Operations system 12 is a module that provides the overall operational functionality for a system in an industry. For example, the operations system 12 for an airline may comprise the following functional components: flight planning and routing, maintenance and engineering, crews, cargo, application support and dispatch control.

Client module 14 may include a graphical user interface for a user, the components necessary to communicate with operations system 12, and the components necessary to communicate with optimizer 16. Client module 14 includes the functionality to receive leg and crew data from operations system 12. In one embodiment, the data is downloaded in flat files. The data may include header information followed by the raw data from the operational system. In another embodiment, the data could downloaded and stored in a relational database or any other data repository. Additionally, the leg and crew data could be stored in XML using strongly-typed in-memory data structures. In such case, relational database schema definitions would be built and parsers would construct the data structures.

Client module 14 may communicate with operations system 12 using commonly known communication protocols. In one embodiment, communication to transmit data to operations system 12 is performed using web services interfaces (such as those provided under Microsoft.Net). In another embodiment, a TCP protocol is used to download the leg and crew.

Optimizer 16 is capable of solving mixed integer problems. In one embodiment, a CPLEX optimization engine is used to solve the mixed integer problem. The optimizer can write to stderr and stdout during execution, to eventually create a flat file for communication to client module 14. While each of operations system 12, client module 14, and optimizer 16 are depicted as being in direct connection, it is contemplated and understood that connectivity may be effectuated through intermediaries, such as web service processes.

Figure 3:
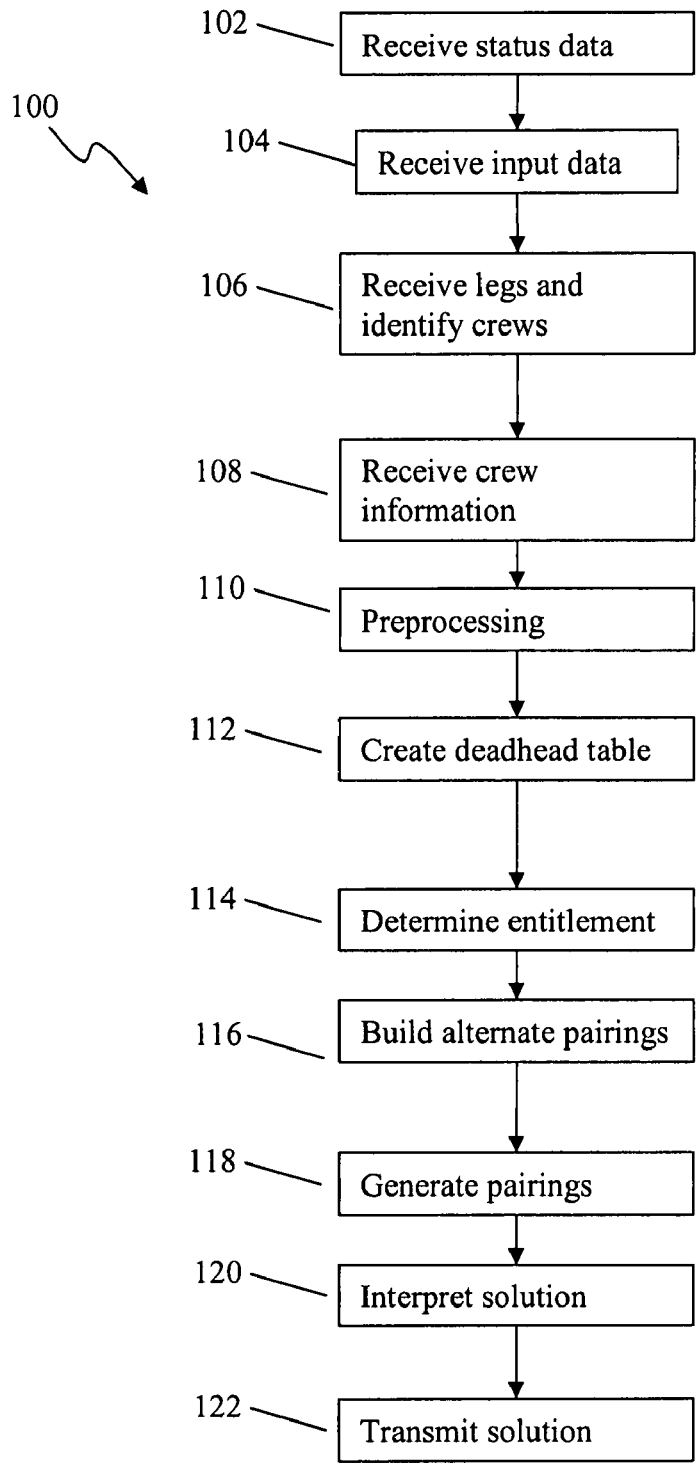
FIG. 3 is a flow diagram of the operation of one embodiment of the present invention.

Referring to FIG. 3, an example operational flow 100 for one embodiment of the present invention is shown. At step 102, status data about the vehicles within the sequences is received from an operational system. In one embodiment, the data is downloaded in flat files. The data may include header information followed by the raw data from the operational system. The data may be stored in flat files, in a single table, separated into individual tables, or stored in a database or any other data repository. The download can be triggered by an event, or may be invoked by a user via a user interface. In one situation, multiple threads can be used to download the information.

In one embodiment, the status data is for flights for an airline, and can include:

flight_number: the flight number of the leg departure_city: the city from which the flight is departing arrival_city: the city to which the flight is going flight_status: the status of the flight (e.g., on time, delayed, canceled or removed)

scheduled_depart_time: the scheduled time that the flight is expected to depart scheduled_arrival_time: the scheduled time that the flight is expected to arrive estimated_departure_time: the estimated time that the flight is expected to depart estimated_arrival_time: the estimated time that the flight is expected to arrive actual_departure_time: the actual time that the flight departed type_of_plane: the make and model of the plane flight_operating_date: the date that the first leg is scheduled to depart operating_crew_members: identification of the crew members that are assigned to the leg operating_crew_member_employee_ID: the employee ID of each of the crew members that are assigned to the leg sequence_ID: an identifier associated with all flights on the sequence for a crew member In another embodiment, the data retrieved is two days back from midnight of the day in which the download occurs through four days after from midnight of the day in which the download occurs.

At step 104, the input data is received. The input data represents all of the relevant information pertaining to the system for the status data. For example, in one embodiment where the status data pertains to airline flights, the input data could include:

static_city: a table of all of the cities in the system fleet: a table of all of the types of vehicles in the system base_equipment: a table of all of the types of equipment that operate at a particular crew base alternative_travel_information: a table of all of the types of alternative travel information, such as, in the airline context, a table of all ground-based transportation types.

The input data may be stored in flat files, in a single table, separated into individual tables, or stored in a database or any other data repository.

At step 106, a set of legs (or a single leg, as the case may be) is received from the operational system. The set of legs could be some, none, or all of the broken legs within the status data. In one embodiment, the set of legs is automatically generated based on the broken status. In another embodiment, the data is displayed in a graphical user interface and a user selects the legs to be included in the set. In an additional embodiment, the graphical user interface can display the set of legs in a color coded format based on the status information.

At step 108, the crew associated with the legs in the set of legs is identified and the corresponding information is retrieved. Crew could mean either a specific individual or group of individuals that assigned to operate the leg. Some of the crew information could include:

employee_number: a number associated with the particular individual complete_sequence: the sequence for that crew member sequence_ID: an identifier associated with the sequence for that crew member sequence_info: information regarding the type of sequence, such as international or domestic, or cockpit or cabin crew working_status: e.g. working or deadhead monthly_activity: e.g. days off between sequences, duty free periods, sick days, training days crew_base_information: e.g. domestic/international, equipment type qualified for, home base, and position within the organization.

At step 110, preprocessing can be performed. Preprocessing calculates the accumulated travel and accumulated duty time for each leg in each sequence. Accumulated travel time represents how much travel time has been incurred on the sequence since the start of the duty day. The accumulated duty time represents how much duty time has been incurred on the sequence since the start of the duty day. Preprocessing may also project the future flying time and future duty time after the leg for each duty. In one embodiment, the information calculated during preprocessing can be used to check for regulatory or contract restrictions.

At step 112, a deadhead table can be built. A deadhead table is a list of non-broken legs that have a vehicle with passenger capacity that is traveling between a departure location and an arrival location. In one embodiment, two deadhead tables are constructed, where one deadhead table contains a list of non-broken legs between a departure location and an arrival location (a 1-leg deadhead table) and the second deadhead table contains a list of non-broken legs with a departure location and a destination location through an intermediary location (a 2-leg deadhead table). The deadhead tables can represent non-broken legs with the normal vehicle, but could also include alternative travel types. For example, the deadhead tables for non-broken airplane flights could also include ground transportation between the departure location and arrival location.

At step 114, in one embodiment, the entitlement for each crew is calculated. The entitlement reflects the minimum amount of travel for which the crew should receive compensation, even if less travel is ultimately assigned than what was originally scheduled. The entitlement may be calculated based on the current crew sequence, contract, business, and government rules; and available deadheads.

At step 116, the pairwise re-assignment options for each crew can be built. In this step, each broken crew sequence is paired with every other broken sequence, in turn.

At step 118, a pairing for each crew member is generated. In one embodiment, optimization techniques may be used to make this assignment of pairings to crew members simultaneously for all affected crew members. In this context, "simultaneously" means that all crew members should be considered at the same time to determine the optimal assignments for every crew, as opposed to examining a pair of crew members A and B and determining whether to swap crew member A's assignment and crew member B's assignment. Any conventional optimization technique may be used, such as, for example, a mixed-integer program (MIP) formulation. The techniques used to build the MIP model and perform the optimization model to be described below are well known to those skilled in the area of linear and integer programming. Such techniques may be found in most standard textbooks on mathematical programming, such as, for example, *Linear Programming and Extensions* by Nesa Wu and Richard Coppins, pp 396-434 (1981), which is incorporated herein by reference. In one embodiment, the MIP formulation used to produce the simultaneous assignment of pairings to crew members is a set-partitioning formulation. The techniques used to create a set-partitioning formulation are well-known to those skilled in the art.

In one embodiment, the MIP formulation can be described as follows:

T is the set of broken crews,
F is the set of flights to be covered,
P(i) is the set of sequences which crew i can work,
$\delta_{i,k,j}$ is an indicator with value 1 if sequence k for crew i covers operational flight j and 0 otherwise,
$m_j$ is the number of crews required by contract, business, or government rules for flight j according to its fleet type,
$c_{i,k}$ is the cost of sequence k for crew i,
$cA_j$ is the penalty cost for not covering flight j,
$cB_j$ is the penalty cost for flight j overlapped, $x_{i,k}$ is the binary decision variable with value 1 if crew i flies sequence k and 0 otherwise,
$y_j$ is the slack variable for problem feasibility associated with flight j,
$z_j$ is the surplus variable associated with flight j.
A general crew recovery problem for a specific crew position can be mathematically written as follows:
Minimize $$s(x, y, z) = \sum_{i \in T} \sum_{k \in P(i)} c_{i,k} x_{i,k} + \sum_{j \in F} (cA_j y_j + cB_j z_j) \quad (1)$$

Subject to $$\sum_{i \in T} \sum_{k \in P(i)} \delta_{i,k,j} x_{i,k} - z_j + y_j = m_j \ (j \in F) \quad (2)$$

$$\sum_{k \in P(i)} x_{i,k} = 1 \ (\forall \ i \in T) \quad (3)$$

$z_j \geq 0$ and integer($j \epsilon F$) (4)

$y_j \geq 0$ and integer($j \epsilon F$) (5)

$x_{i,k} \geq 0$ and integer($\forall i \epsilon T; \forall k \epsilon P(i)$). (6)

The objective function (1) is the sum of sequence costs, penalties for uncovered flights, and penalties for flights overlapped. Constraint set (2) ensures that each flight can be covered exactly $m_j$ times (which, in an airline industry embodiment, may be determined by government or other service requirement for a fleet type). In one embodiment, a slack variable y and a surplus z are assigned to each constraint in the constraint set (2), enforcing problem feasibility. In this particular embodiment, constraint set (3) reflects that each broken crewmember works one sequence only at a time. Constraint sets (4), (5) and (6) are example ranges of the variables. In a further embodiment, the integer requirement for y and z in constraint set (5) and constraint set (6) can be relaxed to continuous variables. In one embodiment, the model is solved by using CPLEX 8.0, provided by ILOG, Inc.

In another embodiment, the objectives and parameters of the problem can be modified by a user using a user interface. Example objectives and parameters that could be modified include minimize system cost or minimize number of uncovered flights, protect the broken crews' down-line pairings, and return to the original pairing as soon as possible in a sequence.

At step 120, the solution from the mixed integer problem (e.g., the new proposed sequences) may be presented to an user interface in the form of the determined pairings, the original sequence, the base sequence, and the new proposed sequence resulting from the solution. If the solution includes uncovered legs (e.g., no crew was found to cover the leg) or open sequences, these can also be displayed in the user interface.

At step 122, the solution is transmitted to the operations system. In some instances, the solution may need to be transformed into a data format that is understandable by the operations system. Each original sequence (with cancelled flight(s) removed) is first compared to its base sequence. Operations system commands are inferred determined so as to change the original sequences to the base sequences. The system may submit these commands to the operations system. Each base sequence may then be compared to its new proposed sequence. Operations system commands are determined so as to transform the base sequences into new proposed sequences. These commands may be grouped into two phases. First, all commands that remove flights from all base sequences may be submitted to the operations system. In the second phase, all commands that add flights to sequences may be submitted.

In one embodiment, the solution is uploaded to the operations system one sequence at a time and awaiting for a response from the operations system before uploading a subsequent sequence. In another embodiment, the solution is uploaded by streaming the solution to the operations system.

After receiving the solution, the operations system may report projected payment, scheduled payment and error messages. In one embodiment, the communications to and from the operation system can be logged and stored, and the log can group responses from the operation system to the correlating sequence. These grouped responses may be displayed in the user interface accompanying the interface display of the original, base, and new proposed sequences to aid in validation of the uploaded data.

Figure 4:
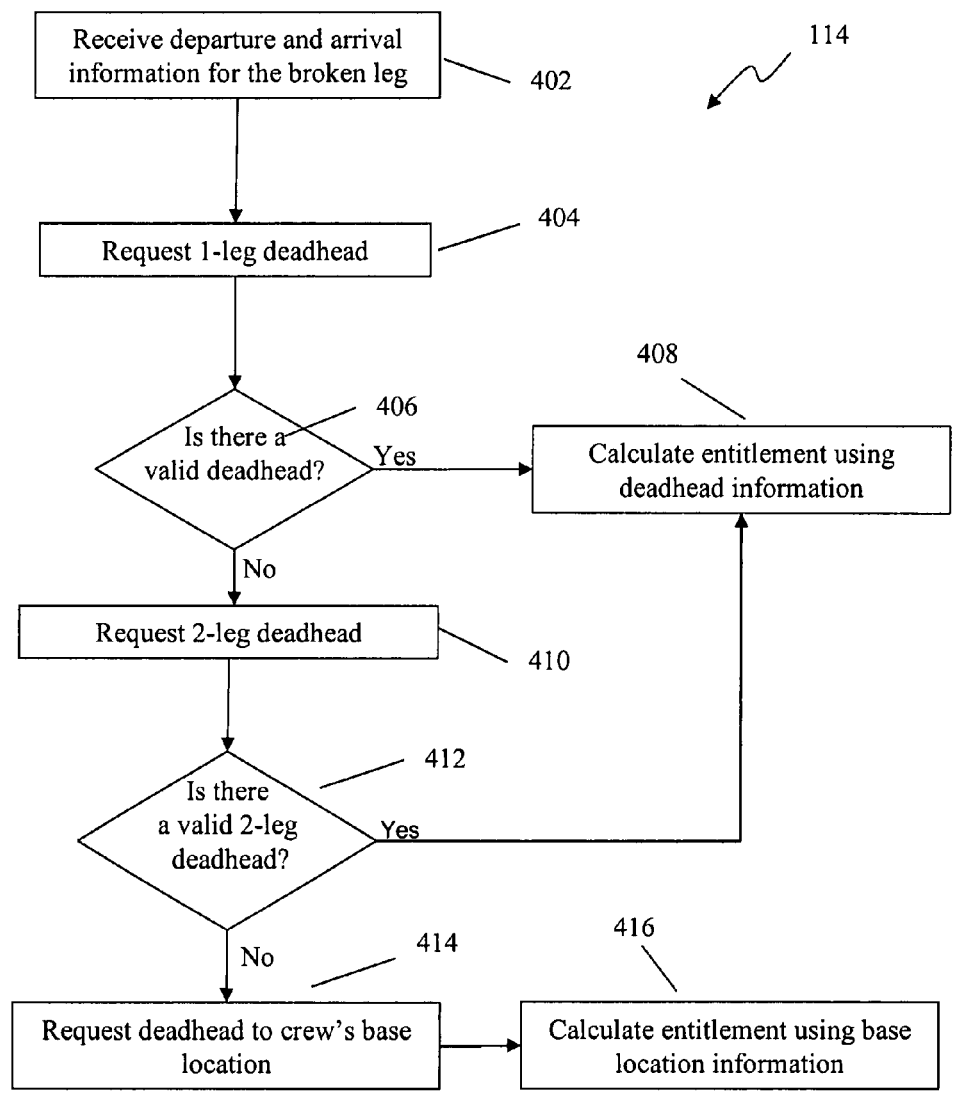
FIG. 4 is a schematic illustration of a system for implementing an embodiment of the present invention.

Referring now to FIG. 4, one embodiment 114 for calculating the entitlement is illustrated. At step 402, the departure city, arrival city, earliest departure time, and latest arrival time are determined for the broken leg. At step 404, a deadhead from the departure city to the arrival city departing after the earliest departure time and arriving before the latest arrival time is requested. At step 406, the 1-leg deadhead table is examined to determine if there is a valid 1-leg deadhead available. In one embodiment, a valid deadhead is a deadhead leg that (1) operates between the originally scheduled departure and arrival cities of the broken leg, (2) departs after the originally scheduled departure time of the broken leg, (3) arrives prior to the check-in time for the next leg, and (4) satisfies all other business, contract, or governmental rules. Other conditions could be imposed in addition to, or in lieu of, the foregoing to determine a valid deadhead. If the applicable conditions are satisfied and a valid deadhead is determined, then the process proceeds to step 408. If the applicable conditions are not satisfied and a valid deadhead cannot be determined, then the process proceeds to step 410.

At step 408, the entitlement is calculated to be the compensation amount for the travel already accomplished on the sequence, plus the compensation amount attributable to the deadhead leg, plus the compensation amount attributable to the scheduled travel subsequent to the deadhead leg on this sequence.

At step 410, the 2-leg deadhead table is examined to determine if there a 2-leg deadhead available that (1) operates between the originally scheduled departure and arrival location of the disrupted leg, (2) departs after the originally scheduled departure time of the disrupted leg, (3) arrives prior to the check-in time for the next leg, and (4) satisfies all other business, contract, or governmental rules. Other conditions could be imposed in addition to, or in lieu of, the foregoing to determine a valid deadhead. If the applicable conditions are satisfied and a valid 2-leg deadhead is determined. If the applicable conditions are satisfied and a valid deadhead is determined, then the process proceeds to step 412. If the applicable conditions are not satisfied and a valid deadhead cannot be determined, then the process proceeds to step 414.

At step 412, the entitlement is calculated to be the compensation amount for the travel already accomplished on the sequence, plus the compensation amount attributable to the deadhead leg, plus the compensation amount attributable to the scheduled travel subsequent to the deadhead leg on this sequence.

At step 414, the deadhead table (or tables) are examined to find the earliest deadhead from the departure location to the crew's assigned base city departing after the earliest departure time. At step 416, the entitlement is calculated to be the compensation amount for the travel already accomplished on the sequence, plus the compensation amount attributable to the earliest deadhead back to the assigned crew base. In one embodiment, the sequence for each crew that results from the calculation of the entitlement is called the base sequence for that crew.

Figure 5:
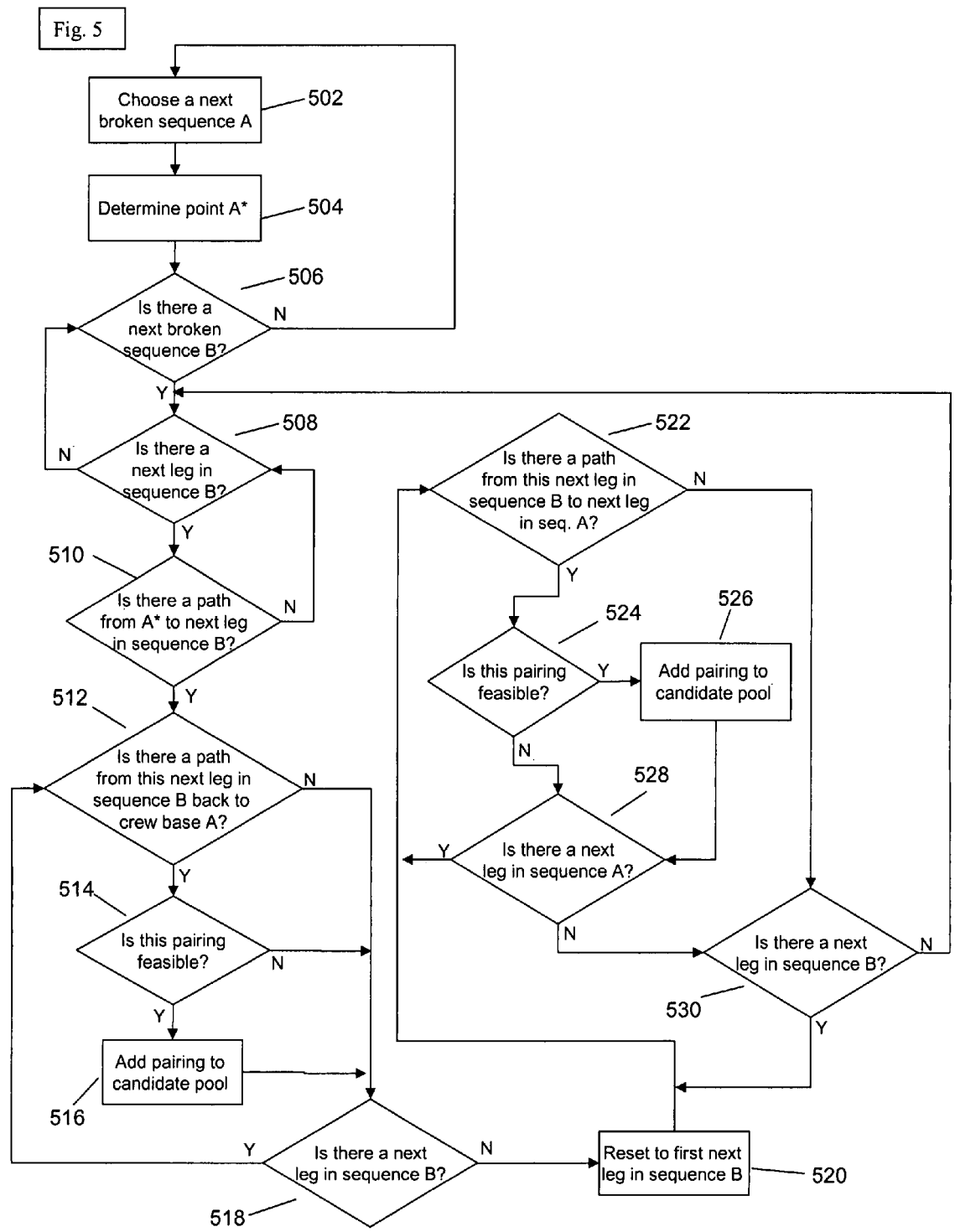
FIG. 5 is a flow diagram of the operation of one embodiment of the present invention.

Referring now to FIG. 5, one embodiment 116 for building pairwise re-assignment options for each crew is illustrated. For illustrative purposes, a sequence A will be used, with the legs following the broken leg designated as $A_1, A_2, \ldots A_n$, the departure location of the legs on sequence A designated as $S_{A1}, S_{A2}, \ldots S_{An}$, and the departure time of the legs on sequence A designated as $d_{A1}, d_{A2}, \ldots d_{An}$. Similarly for a sequence B, the legs are designated $B_1, B_2, \ldots B_n$, departure locations as $S_{B1}, S_{B2}, \ldots S_{Bn}$, and departure times as $d_{B1}, d_{B2}, \ldots d_{Bn}$. The crew base for sequence A is designated $CB_A$.

At step 502, a sequence is examined. In this example, sequence A will be used. At step 504, the location that the disruption occurs at is designated SA*, the time that the disruption occurs is designated as time TA*, and the point of disruption is designated point A*. At step 506, the system attempts to construct a path from point A* to each leg $B_i$ on sequence B. If SA* and $S_{Bi}$ are the same, and TA* is earlier than $d_B$; by at least a crew turn, then a direct path from point A* to leg $B_i$ is built. If SA* and $S_{Bi}$ can be connected by an alternative form of transport (for example, in an airline industry context, by ground transport), and TA* is earlier than $d_{Bi}$ by at least the travel time associated with the alternative form of transport plus a crew turn, then a path from point A* to leg $B_i$ is built using the alternative form of transport. If SA* and $S_{Bi}$ can be connected only by the standard form of transport (for example, in an airline industry context, by air travel), then a deadhead may be built if a deadhead is found in the one-leg or two-leg deadhead table that departs SA* after TA* and arrives at $S_{Bi}$ prior to a crew turn before $d_{Bi}$.

If at least one path can be built from sequence A to sequence B, then sequence B may be examined at each leg subsequent to the first such path to find a path back to sequence A or to $CB_A$. At step 508, each point on sequence B is examined to determine if a path exists from $S_{Bi}$; to $CB_A$. At step 510, paths from sequence B back to sequence A may be built in the same manner as paths from sequence A to sequence B as described above.

Once all paths are found, all alternate sequences for the crew originally assigned to sequence A can be built. An alternate sequence may comprise: (1) all travel on sequence A prior to the disruption, (2) a path (either a direct path, a standard path, or an alternative path) from sequence A to sequence B, (3) some number of legs on sequence B directly following this path, (4) a path back from sequence B to sequence A, and (5) the remainder of legs on sequence A. Alternately, the alternate sequence may comprise (1) all travel on sequence A prior to the disruption, (2) a path (either a direct path, a standard path, or an alternative path) from sequence A to sequence B, (3) some number of legs on sequence B directly following this path, and (4) a path back to $CB_A$. Once an alternate sequence is found, it may be checked for legality against contractual, business, and governmental rules.

In steps 512, if the alternate sequence is found to be legal, it may be placed in the pool of alternate sequences. All possible paths starting at point A* involving some number of legs on sequence B and returning to sequence A or to $CB_A$ are examined in this way. All sequences found to be legal are placed in the pool of alternate sequences.

This process may be repeated for each ordered pair of broken sequences. All alternate sequences that have been placed in the pool, along with all base sequences form the pool of candidate sequences.

Figure 6:
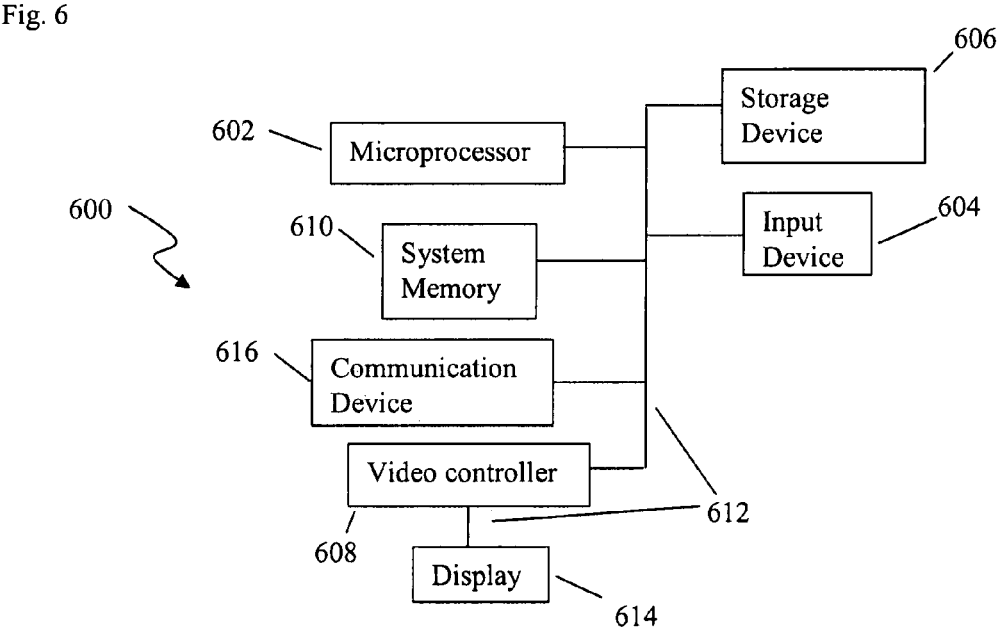
FIG. 6 is a schematic illustration of a node for implementing an embodiment of the present invention.

It will also be understood by those having skill in the art that one or more (including all) of the elements/steps of the present invention may be implemented using software executed on a general purpose computer system or networked computer systems, using special purpose hardware-based computer systems, or using combinations of special purpose hardware and software. Referring to FIG. 6, an illustrative node 600 for implementing an embodiment of the method is depicted. Node 600 includes a microprocessor 602, an input device 604, a storage device 606, a video controller 608, a system memory 610, and a display 614, and a communication device 616 all interconnected by one or more buses 612. The storage device 606 could be a floppy drive, hard drive, CD-ROM, optical drive, or any other form of storage device. In addition, the storage device 606 may be capable of receiving a floppy disk, CD-ROM, DVD-ROM, or any other form of computer-readable medium that may contain computer-executable instructions. Further communication device 616 could be a modem, network card, or any other device to enable the node to communicate with other nodes. It is understood that any node could represent a plurality of interconnected (whether by intranet or Internet) computer systems, including without limitation, personal computers, mainframes, PDAs, and cell phones.

A computer system typically includes at least hardware capable of executing machine readable instructions, as well as the software for executing acts (typically machine-readable instructions) that produce a desired result. In addition, a computer system may include hybrids of hardware and software, as well as computer sub-systems.

Hardware generally includes at least processor-capable platforms, such as client-machines (also known as personal computers or servers), and hand-held processing devices (such as smart phones, personal digital assistants (PDAs), or personal computing devices (PCDs), for example). Further, hardware may include any physical device that is capable of storing machine-readable instructions, such as memory or other data storage devices. Other forms of hardware include hardware sub-systems, including transfer devices such as modems, modem cards, ports, and port cards, for example.

Software includes any machine code stored in any memory medium, such as RAM or ROM, and machine code stored on other devices (such as floppy disks, flash memory, or a CD ROM, for example). Software may include source or object code, for example. In addition, software encompasses any set of instructions capable of being executed in a client machine or server.

Combinations of software and hardware could also be used for providing enhanced functionality and performance for certain embodiments of the disclosed invention. One example is to directly manufacture software functions into a silicon chip. Accordingly, it should be understood that combinations of hardware and software are also included within the definition of a computer system and are thus envisioned by the invention as possible equivalent structures and equivalent methods.

Computer-readable mediums include passive data storage, such as a random access memory (RAM) as well as semi-permanent data storage such as a compact disk read only memory (CD-ROM). In addition, an embodiment of the invention may be embodied in the RAM of a computer to transform a standard computer into a new specific computing machine.

Data structures are defined organizations of data that may enable an embodiment of the invention. For example, a data structure may provide an organization of data, or an organization of executable code. Data signals could be carried across transmission mediums and store and transport various data structures, and, thus, may be used to transport an embodiment of the invention.

The system may be designed to work on any specific architecture. For example, the system may be executed on a single computer, local area networks, client-server networks, wide area networks, internets, hand-held and other portable and wireless devices and networks.

A database may be any standard or proprietary database software, such as Oracle, Microsoft Access, SyBase, or DBase II, for example. The database may have fields, records, data, and other database elements that may be associated through database specific software. Additionally, data may be mapped. Mapping is the process of associating one data entry with another data entry. For example, the data contained in the location of a character file can be mapped to a field in a second table. The physical location of the database is not limiting, and the database may be distributed. For example, the database may exist remotely from the server, and run on a separate platform. Further, the database may be accessible across the Internet. Note that more than one database may be implemented.

Moreover, while different steps, processes, and procedures are described as appearing as distinct acts, it is understood that the steps, process, and procedures could also be performed in different orders, simultaneously, or sequentially. Additionally, the steps, processes, and procedures could be merged into one or more steps, processes, or procedures.

A method for allocating crew members, comprising identifying a plurality of legs, identifying a first crew and a first sequence associated with a first broken leg of the plurality of legs, identifying a second crew and a second sequence associated with a second broken leg of the plurality of legs, generating a plurality of new sequences for the first crew and the second crew using deadheads; and generating a solution for each crew using a mixed integer program.

A system for allocating crew, comprising a graphical user interface that is capable of displaying a plurality of broken legs that are selectable by a user, and that is capable of receiving solution parameters from the user, a client in communication with the graphical user interface that is capable of receiving a data file from an operations system that comprises data relating to the plurality of legs, and an optimizer in communication with the client that is capable of generating a solution using the plurality of broken legs selected by the user and the solution parameters, and that is capable of transmitting a solution.

A computer-readable medium comprising a series of instructions for use by at least one computer processor, wherein the instructions are for receiving data from an operations system, identifying a plurality of legs within the data, wherein at least two legs of the plurality of legs are broken, identifying a first crew and a first sequence associated with the first leg of the at least two broken legs, identifying a second crew and a second sequence associated with the second leg of the at least two broken legs, creating at least one deadhead table using the data, generating a base sequence for each of the first crew and second crew in accordance with business rules, generating a first plurality of new sequences for the first crew using deadhead information from the at least one deadhead table, generating a second plurality of new sequences for the second crew using deadhead information from the at least one deadhead table, generating a solution by solving a mixed integer problem using the first plurality of new sequences and the second plurality of new sequences, and transmitting the solution to the operations system.

A method for allocating crew members, comprising receiving data from an operations system, selecting a plurality of sequences that have a broken leg from the data, creating a 1-leg deadhead table from the data, creating a 2-leg deadhead table from the data, generating a plurality of new sequences to form a sequence candidate pool using deadhead information from the 1-leg deadhead table and deadhead information from the 2-leg deadhead table, receiving parameters from a user with respect to the plurality of sequences, generating a solution for the plurality of sequences by solving a set-partition problem using the sequence candidate pool and the parameters.

A system for allocating crew members, comprising means for identifying a plurality of legs within the data, wherein at least two legs of the plurality of legs are broken, means for identifying a first crew and a first sequence associated with the first leg of the at least two broken legs, means for identifying a second crew and a second sequence associated with the second leg of the at least two broken legs, means for creating at least one deadhead table using the data, means for generating a plurality of new sequences for the first crew using deadhead information from the at least one deadhead table, means for generating a plurality of new sequences for the second crew using deadhead information from the at least one deadhead table, means for generating a solution for each crew by solving a mixed integer problem, and means for transmitting the solution to the operations system.

The foregoing has outlined features of several embodiments according to aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A method for allocating crew members, comprising:
   identifying a plurality of legs;
   identifying a first broken crew and a first sequence associated with a first broken leg of the plurality of legs;
   identifying a second broken crew and a second sequence associated with a second broken leg of the plurality of legs;
   generating a plurality of new sequences for the first broken crew and the second broken crew using deadheads; and
   generating, using one or more computers, a solution for each of the first and second broken crews using a mixed integer program, the mixed integer program comprising a problem represented by:

minimize $$s(x, y, z) = \sum_{i \in T} \sum_{k \in P(i)} c_{i,k} x_{i,k} + \sum_{j \in F} (cA_j y_j + cB_j z_j), \quad (1)$$

subject to:

$$\sum_{i \in T} \sum_{k \in P(i)} \delta_{i,k,j} x_{i,k} - z_j + y_j = m_j \ (j \in F); \quad (2)$$

$$\sum_{k \in P(i)} x_{i,k} = 1 \ (\forall \ i \in T); \quad (3)$$

$z_j \geq 0$ and integer$(j \epsilon F)$ (4)

$y_j \geq 0$ and integer$(j \epsilon F)$; and (5)

$x_{i,k} \geq 0$ and integer$(\forall i \epsilon T; \forall k \epsilon P(i))$; (6)

where T is a set of the broken crews;
where F is a set of operational legs to be covered;
where P (i) is a set of the new sequences which a broken crew i can work;
where $\delta_{i,k,j}$ is an indicator with value 1 when a sequence k for the broken crew i covers an operational leg j and 0 otherwise;
where $m_j$ is a number of crews required by contract, business, or government rules for the operational leg j according to its fleet type;
where $c_{i,k}$ is a cost of the sequence k for the broken crew i;
where $cA_j$ is a first penalty cost associated with not covering the operational leg j;
where a $cB_j$ is a second penalty cost associated with the operational leg j overlapped;
where $x_{i,k}$ is a binary decision variable with value 1 when the broken crew i flies the sequence k and 0 otherwise;
where $y_j$ is a slack variable for problem feasibility associated with the operational leg j; and
where $z_j$ is a surplus variable associated with the operational leg j.

2. The method of claim 1, further comprising:
transmitting the solution to an operations system.

3. The method of claim 2, wherein transmitting the solution to an operations system comprises:
transmitting a first sequence of the solution to the operations system; and
receiving a response from the operations system before transmitting a second sequence of the solution to the operations system.

4. The method of claim 2, wherein transmitting the solution to an operations system comprises:
streaming a plurality of sequences within the solution to the operations system; and
receiving a response from the operations system after all of the plurality of sequences within the solution have been streamed to the operations system.

5. The method of claim 1, further comprising:
generating a deadhead table.

6. The method of claim 5, wherein generating the deadhead table comprises:
generating a 1-leg deadhead table.

7. The method of claim 5, wherein generating the deadhead table comprises:
generating a 2-leg deadhead table.

8. The method of claim 5, wherein generating a deadhead table generates a table that comprises non-broken legs for a first type of transportation and non-broken legs for a second type of transportation.

9. The method of claim 1, further comprising:
generating a base sequence for each of the first and second broken crews.

10. The method of claim 1, further comprising:
receiving data about the plurality of legs from an operations system.

11. The method of claim 10, wherein receiving data from an operations system comprises:
receiving data about the plurality of legs in a range of two days prior to the day in which data is received and through four days after the day in which data is received.

12. A system for allocating crew, comprising:
a graphical user interface that is capable of displaying a plurality of broken legs that are selectable by a user, and that is capable of receiving solution parameters from the user;
a client in communication with the graphical user interface that is capable of receiving a data file from an operations system that comprises data relating to the plurality of legs; and
an optimizer in communication with the client that is capable of generating a solution using the plurality of broken legs selected by the user and the solution parameters, and that is capable of transmitting the solution, wherein the solution is generated using a mixed integer problem represented by:

minimize $$s(x, y, z) = \sum_{i \in T} \sum_{k \in P(i)} c_{i,k} x_{i,k} + \sum_{j \in F} (cA_j y_j + cB_j z_j), \quad (1)$$

subject to:

$$\sum_{i \in T} \sum_{k \in P(i)} \delta_{i,k,j} x_{i,k} - z_j + y_j = m_j \ (j \in F); \quad (2)$$

$$\sum_{k \in P(i)} x_{i,k} = 1 \ (\forall \ i \in T); \quad (3)$$

$z_j \geq 0$ and integer$(j \epsilon F)$; (4)

$y_j \geq 0$ and integer$(j \epsilon F)$; and (5)

$x_{i,k} \geq 0$ and integer$(\forall i \epsilon T; \forall k \epsilon P(i))$; (6)

where T is a set of the broken crews;
where F is a set of operational legs to be covered;
where P (i) is a set of the new sequences which a broken crew i can work;
where $\epsilon_{i,k,j}$ is an indicator with value 1 when a sequence k for the broken crew i covers an operational leg j and 0 otherwise;

where $m_j$ is a number of crews required by contract, business, or government rules for the operational leg j according to its fleet type;

where $c_{i,k}$ is a cost of the sequence k for the broken crew i;

where $cA_j$ is a first penalty cost associated with not covering the operational leg j;

where $cB_j$ is a second penalty cost associated with the operational leg j overlapped;

where $x_{i,k}$ is a binary decision variable with value 1 when the broken crew i flies the sequence k and 0 otherwise;

where $y_j$ is a slack variable for problem feasibility associated with the operational leg j; and where $z_j$ is a surplus variable associated with the operational leg j.

13. The system of claim 12, wherein the graphical user interface is capable of displaying the solution to the user.

14. The system of claim 12, wherein the optimizer transmits the solution to the client.

15. The system of claim 12, wherein the optimizer transmits the solution to the operations system.

16. The system of claim 12, wherein the client transmits the solution to the operations system.

17. A non-transitory computer-readable medium comprising a series of instructions for use by at least one computer processor, wherein the instructions are for:
receiving data from an operations system;
identifying a plurality of legs within the data, wherein at least two legs of the plurality of legs are broken;
identifying a first broken crew and a first sequence associated with the first leg of the at least two broken legs;
identifying a second broken crew and a second sequence associated with the second leg of the at least two broken legs;
creating at least one deadhead table using the data;
generating a base sequence for each of the first and second broken crews in accordance with business rules;
generating a first plurality of new sequences for the first broken crew using deadhead information from the at least one deadhead table;
generating a second plurality of new sequences for the second broken crew using deadhead information from the at least one deadhead table;
generating a solution by solving a mixed integer problem using the first plurality of new sequences and the second plurality of new sequences, wherein the mixed integer problem is represented by:
minimize $$s(x, y, z) = \sum_{i \in T} \sum_{k \in P(i)} c_{i,k} x_{i,k} + \sum_{j \in F} (cA_j y_j + cB_j z_j), \quad (1)$$

subject to:

$$\sum_{i \in T} \sum_{k \in P(i)} \delta_{i,k,j} x_{i,k} - z_j + y_j = m_j \ (j \in F); \quad (2)$$

$$\sum_{k \in P(i)} x_{i,k} = 1 \ (\forall \ i \in T); \quad (3)$$

$z_j \geq 0$ and integer$(j \in F)$; (4)

$y_j \geq 0$ and integer$(j \in F)$; and (5)

$x_{i,k} \geq 0$ and integer$(\forall i \in T; \forall k \in P(i))$; (6)

where T is a set of the broken crews;
where F is a set of operational legs to be covered;
where P (i) is a set of the new sequences which a broken crew i can work;
where $\delta_{i,k,j}$ is an indicator with value 1 when a sequence k for the broken crew i covers an operational leg j and 0 otherwise;
where $m_j$ is a number of crews required by contract, business, or government rules for the operational leg j according to its fleet type;
where $c_{i,k}$ is a cost of the sequence k for the broken crew i;
where $cA_j$ is a first penalty cost associated with not covering the operational leg j;
where $cB_j$ is a second penalty cost associated with the operational leg j overlapped;
where $x_{i,k}$ is a binary decision variable with value 1 when the broken crew i flies the sequence k and 0 otherwise;
where $y_j$ is a slack variable for problem feasibility associated with the operational leg j;
where $z_j$ is a surplus variable associated with the operational leg j; and
transmitting the solution to the operations system.

18. A system for allocating crew members, comprising:
means for receiving data from an operations system; means for identifying a plurality of legs within the data, wherein at least two legs of the plurality of legs are broken;
means for identifying a first broken crew and a first sequence associated with the first leg of the at least two broken legs;
means for identifying a second broken crew and a second sequence associated with the second leg of the at least two broken legs;
means for creating at least one deadhead table using the data;
means for generating a plurality of new sequences for the first broken crew using deadhead information from the at least one deadhead table;
means for generating a plurality of new sequences for the second broken crew using deadhead information from the at least one deadhead table;
means for generating a solution for each of the first and second broken crews by solving a mixed integer problem, wherein the mixed integer problem is represented by:
minimize $$s(x, y, z) = \sum_{i \in T} \sum_{k \in P(i)} c_{i,k} x_{i,k} + \sum_{j \in F} (cA_j y_j + cB_j z_j), \quad (1)$$

subject to $$\sum_{i \in T} \sum_{k \in P(i)} \delta_{i,k,j} x_{i,k} - z_j + y_j = m_j \ (j \in F); \quad (2)$$

$$\sum_{k \in P(i)} x_{i,k} = 1 \; (\forall \, i \in T); \quad (3)$$

$$z_j \geq 0 \text{ and integer}(j \epsilon F); \quad (4)$$

$$y_j \geq 0 \text{ and integer}(j \epsilon F); \text{ and} \quad (5)$$

$$x_{i,k} \geq 0 \text{ and integer}(\forall i \epsilon T; \forall k \epsilon P(i)); \quad (6)$$

where T is a set of the broken crews;
where F is a set of operational legs to be covered;
where P (i) is a set of the new sequences which a broken crew i can work;
where $\delta_{i,k,j}$ is an indicator with value 1 when a sequence k for the broken crew i covers an operational leg j and 0 otherwise;
where $m_j$ is a number of crews required by contract, business, or government rules for the operational leg j according to its fleet type;
where $c_{i,k}$ is a cost of the sequence k for the broken crew i;
where $cA_j$ is a first penalty cost associated with not covering the operational leg j;
where $cB_j$ is a second penalty cost associated with the operational leg j overlapped;
where $x_{i,k}$ is a binary decision variable with value 1 when the broken crew i flies the sequence k and 0 otherwise;
where $y_j$ is a slack variable for problem feasibility associated with the operational leg j;
where $z_j$ is a surplus variable associated with the operational leg j;
and
means for transmitting the solution to the operations system.

* * * * *